(12) United States Patent
Jang

(10) Patent No.: US 6,418,626 B1
(45) Date of Patent: Jul. 16, 2002

(54) PRUNING SHEARS WITH A LOCK DEVICE

(76) Inventor: Ming-Shan Jang, No. 103, Nanshe Rd., Chingshui Chen, Taichung Hsien (TW)

( * ) Notice: Subject to any disclaimer, the term of this patent is extended or adjusted under 35 U.S.C. 154(b) by 0 days.

(21) Appl. No.: 09/699,621

(22) Filed: Oct. 30, 2000

(51) Int. Cl.$^7$ ................................................ B26B 13/16
(52) U.S. Cl. .............................. 30/262; 30/254; 30/341
(58) Field of Search .......................... 30/262, 254, 160, 30/161, 340, 341, 342, 343, 344, 186

(56) References Cited

U.S. PATENT DOCUMENTS

| | | | | |
|---|---|---|---|---|
| 3,235,964 A | * | 2/1966 | Young | 30/262 |
| 3,775,846 A | * | 12/1973 | Johnson | 30/262 |
| 4,031,621 A | * | 6/1977 | Arlett | 30/262 |
| 4,073,059 A | * | 2/1978 | Wallace et al. | 30/262 |
| 4,272,887 A | * | 6/1981 | Poehlmann | 30/161 |
| 4,404,748 A | * | 9/1983 | Wiethoff | 30/161 |
| 6,276,063 B1 | * | 8/2001 | Chen | 30/161 |

FOREIGN PATENT DOCUMENTS

| | | | | |
|---|---|---|---|---|
| AU | 250813 A | * | 4/1964 | |
| DE | 1242038 A | * | 6/1965 | |
| GB | 2210821 A | * | 12/1988 | |

* cited by examiner

*Primary Examiner*—Boyer Ashley
*Assistant Examiner*—Thomas J. Druan, Jr.
(74) *Attorney, Agent, or Firm*—Alan Kamrath; Rider, Bennett, Egan & Arundel, LLP

(57) ABSTRACT

A pair of pruning shears has two bodies pivotally mounted together with a pivot, a spring connected between the bodies, and a lock device arranged near the pivot. The lock device comprises a step hole defined in one of the bodies near the pivot, a locking hole defined in the other body, a latch post moveably mounted in the step hole, a biasing member to support the latch post, and a knob. The knob is rotatably mounted on the body with the step hole. The knob has a bottom abutting the latch post and a cavity defined in the bottom. When the bodies are pushed toward to each other, the step hole will align with the locking hole. The latch post can be pushed to engage with the locking hole by the bottom of the knob. This can provide a secure positioning effect to the latch post. The latch post will not escape from the locking hole when the pruning shears bump with another object.

2 Claims, 6 Drawing Sheets

PRUNING SHEARS WITH A LOCK DEVICE

BACKGROUND OF THE INVENTION

1. Field of the Invention

The present invention relates to a pair of pruning shears, and more particularly to a pair of pruning shears having a lock device to securely hold the shears in a pushed position.

2. Description of Related Art

With reference to FIG. 6, a pair of conventional pruning shears in accordance with the prior art comprises two bodies (30,32) pivotally mounted together with a pivot. Each body (30,32) has a cutting end (302,322) formed on one end thereof and a handle (304,324) on another end. A spring (34) is connected between the handles (304,324) of the bodies (30,32) to provide a biasing force to push the handles (304,324) far away from each other. Therefore, the cutting ends (302,322) of the bodies (30,32) will keep in an open condition by the biasing force of the spring (34). However, a user, especially a child, is easily cut by the open cutting ends (302,322) of the bodies (30,32) when he or she holds the pruning shears in play. Consequently, a lock device is always disposed between the bodies (30,32) to keep the pruning shears in a closed condition when the shears are not in use.

The conventional lock device comprises a block (36) slidably mounted on the handle (304) of one of the bodies (30) and a recess (326) defined in the cutting end (322) of the other one of the bodies (32). When the bodies (30,32) are pushed toward to each other, the recess (326) will face the block (36). The bodies (30,32) will be locked as the block (36) is pushed to slide along the handle (304) and engage with the recess (326). With such a lock device, the pruning shears can be held in the closed condition so as to avoid a person being cut by the cutting ends (302,322).

However, because no positioning structure is applied to the block (36), the engagement between the block (36) and recess (306) is not enough. In particular, there is always a gap defined between the block (36) and the body (30) to reduce the friction therebetween and this will further decrease the engaging strength between the block (36) and the recess (326) furthermore, the block (36) easily escapes from the recess (326) as the pruning shears bumps with another object or drops to the ground.

To overcome the shortcomings, the present invention tends to provide a pair of pruning shears with an improved lock device to mitigate or obviate the aforementioned problems.

SUMMARY OF THE INVENTION

The main objective of the invention is to provide a pair of pruning shears with a lock device to securely hold the shears in a closed position. The pruning shears comprises two bodies pivotally mounted together with a pivot, a spring connected between the bodies and a lock device arranged near the pivot. The lock device comprises a step hole, a locking hole, a latch post, a biasing member and a knob. The step hole is defined in one of the bodies near the pivot, and the locking hole is defined in the other body to align with the step hole when the bodies are pushed together. The latch post is moveably mounted in the step hole. The biasing member is received in the step hole to support the latch post. The knob is rotatably mounted on the body with the step hole. The knob has a bottom abutting the latch post and a cavity defined in the bottom of the knob to face the latch post. The latch post can be pushed to engage with the locking hole by the bottom of the knob. This can provide a securely positioning effect to the latch post to avoid the post escaping from the locking hole as the pruning shears bump with another object, fall, etc.

Other objects, advantages and novel features of the invention will become more apparent from the following detailed description when taken in conjunction with the accompanying drawings.

DETAILED DESCRIPTION OF PREFERRED EMBODIMENT

Figure 1:
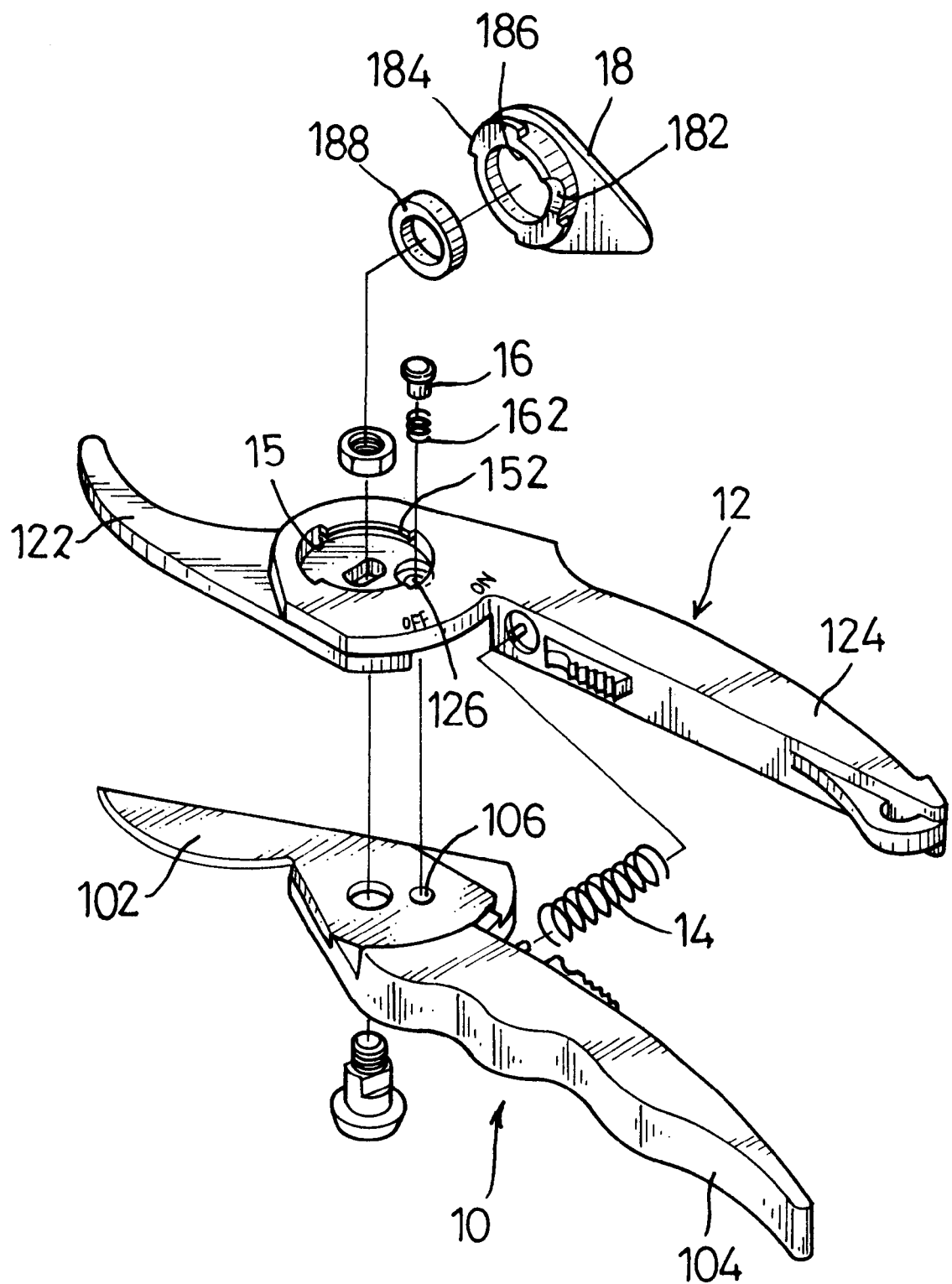
FIG. 1 is an exploded perspective view of a pair of pruning shears with a lock device in accordance with the invention.

With reference to FIG. 1, a pair of pruning shears in accordance with the present invention comprises two bodies (10,12) pivotally mounted together with a pivot (not numbered), a spring (14) and a lock device arranged near the pivot. Each body (10,12) has a cutting end (102,122) formed on one end thereof and a handle (104,124) on another end. The spring (14) is connected between the handles (104,124) of the bodies (10,12) to provide a biasing force to keep distal ends of the handles (104, 124) far away from each other.

The lock device comprises a step hole (126), a locking hole (106), a latch post (16), a biasing member (162) and a knob (18). The step hole (126) is defined in one of the bodies, in this embodiment (12), near the pivot. The locking hole (106) is defined in the other one of the bodies (14) to align with the step hole (126) when the bodies (10,12) are pushed to close. The latch post (16) is moveably mounted in the step hole (126). The biasing member (162) is received in the step hole (126) to support the latch post (16). The knob (18) is rotatably mounted on the body (12) via the step hole (126). The knob (18) has a bottom which abuts the latch post (16), and a cavity (182) defined in the bottom of the knob (18) faces the latch post (16). A recess (186) is defined in the bottom of the knob (18). An annular collar (188) is received in the recess to hold the pivot for connecting the two bodies (10,12). Consequently, the knob (18) will not diametrically vibrate relative to the body (12) due to the engagement between the collar (188) and the pivot.

A chamber (15) is defined in the body (12) to rotatably receive the knob (18), and the step hole (126) is defined in a periphery defining the chamber (15). Two flanges (184) separately and laterally extend from a bottom of the knob (18). The flanges (184) are preferably at opposite sides of the diameter of the knob (18). Each flange (184) has a length in 90° radian. Two extensions (152) separately and laterally extend into the chamber (15) at opposite ends of the diameter of the chamber (15). Each extension (152) is apart from the face of the chamber (15), and a channel is defined between each extension (152) and a respective face of the chamber (15). To fit with the flange (184) on the knob (18), each extension (152) has a length in 90° radian.

Figure 2:
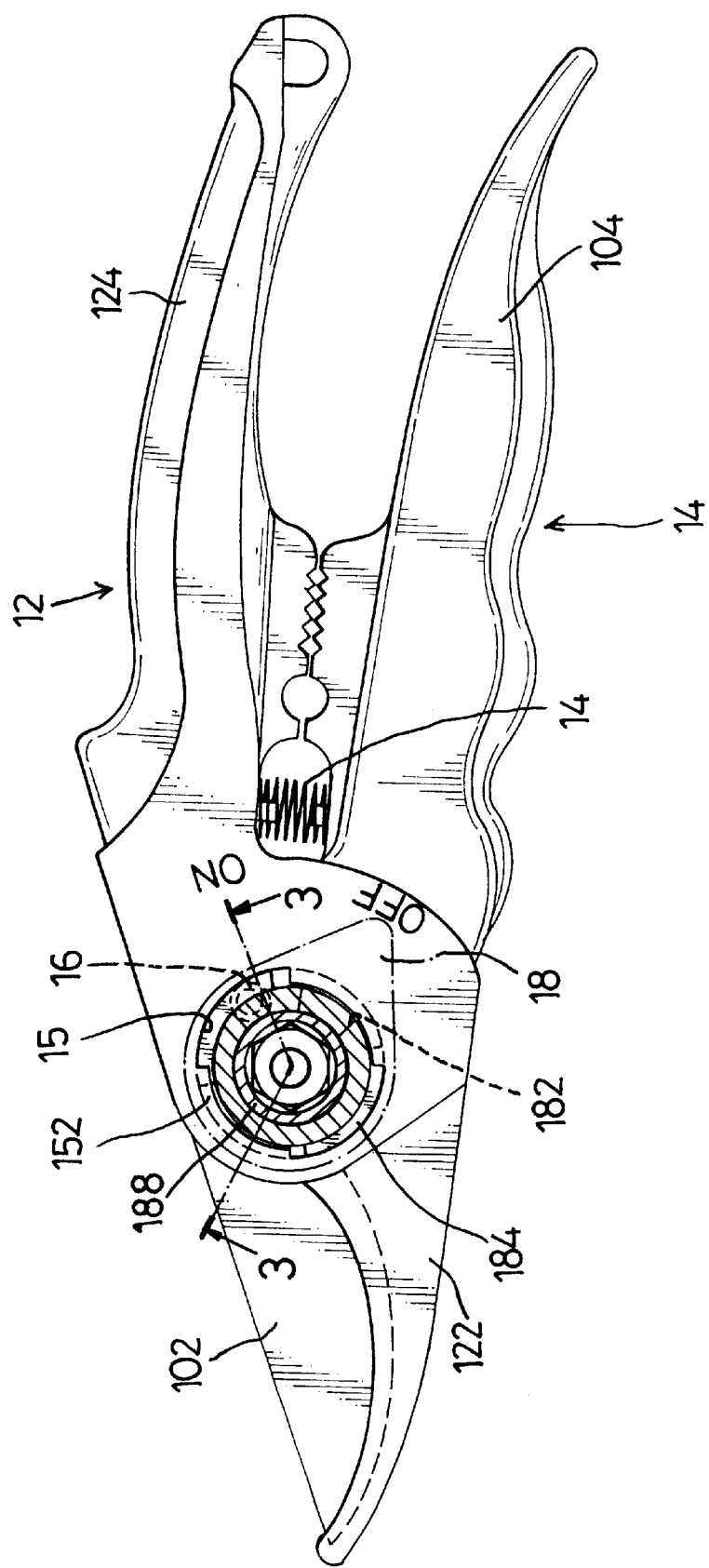
FIG. 2 is a front plan view in partial section of the pair of pruning shears in FIG. 1 showing the bodies being kept in a closed condition by the lock device.
Figure 3:
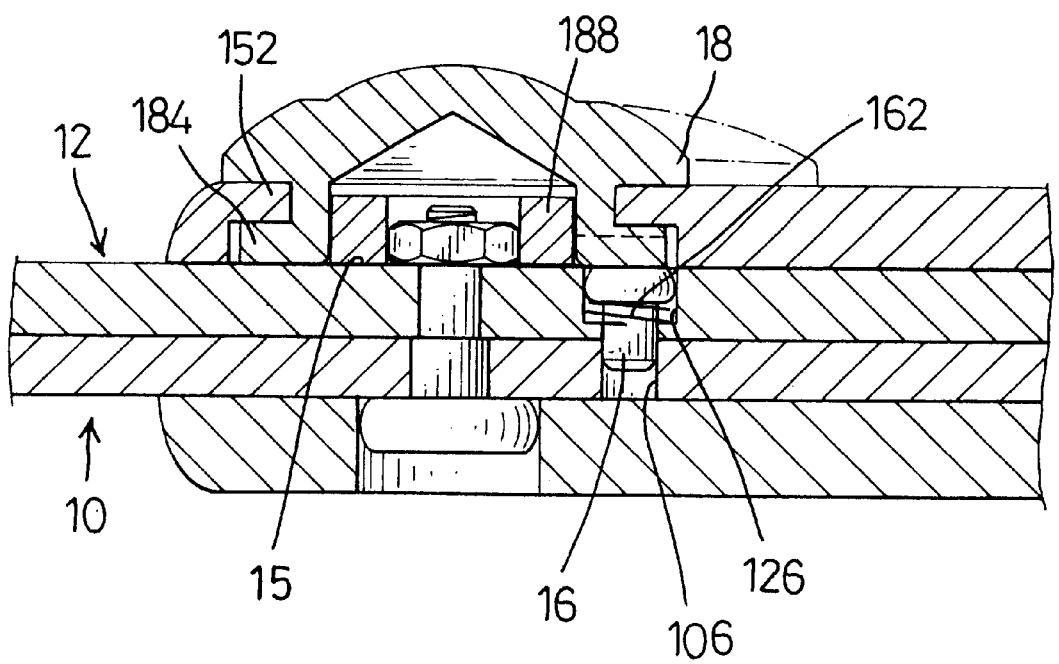
FIG. 3 is a partial side plan view in partial section of the lock device in FIG. 2 showing the bodies being locked.

By such an arrangement, when each flange (184) faces a gap defined between the adjacent extensions (152), the knob (18) can be put into the chamber (15). Then the knob (18) is rotated such that each flange (184) is moved into the channel and abuts a bottom side of a respective one of the extensions (152). Consequently, the knob (18) can be rotatably held in the chamber (15) by the engagement between each flange (184) and extension (152). In locking the pruning shears, with reference to FIGS. 2 and 3, the distal ends of the bodies (10,12) are firstly pushed close to each other whereby the locking hole (106) aligns with the step hole (126). Then the knob (18) is rotated to an angle that the portion of bottom of the knob (18) without the cavity (182) faces and abuts the latch post (16). The latch post (16) is then pushed into and engages with the locking hole (106) and the biasing member (162) is pressed. The bodies (10,12) are locked by the engagement of the latch post (16) and locking hole (106). The pruning shears can be held in a closed condition by the lock device. With such a lock device, the knob (18) can provide a good limiting effect to the latch post (16). The latch post (16) will not escape from the locking hole (106) when the pruning shears bumps with another object or drops to the ground. This can provide good safety to a person, even when he or she holds the pruning shears in play.

Figure 4:
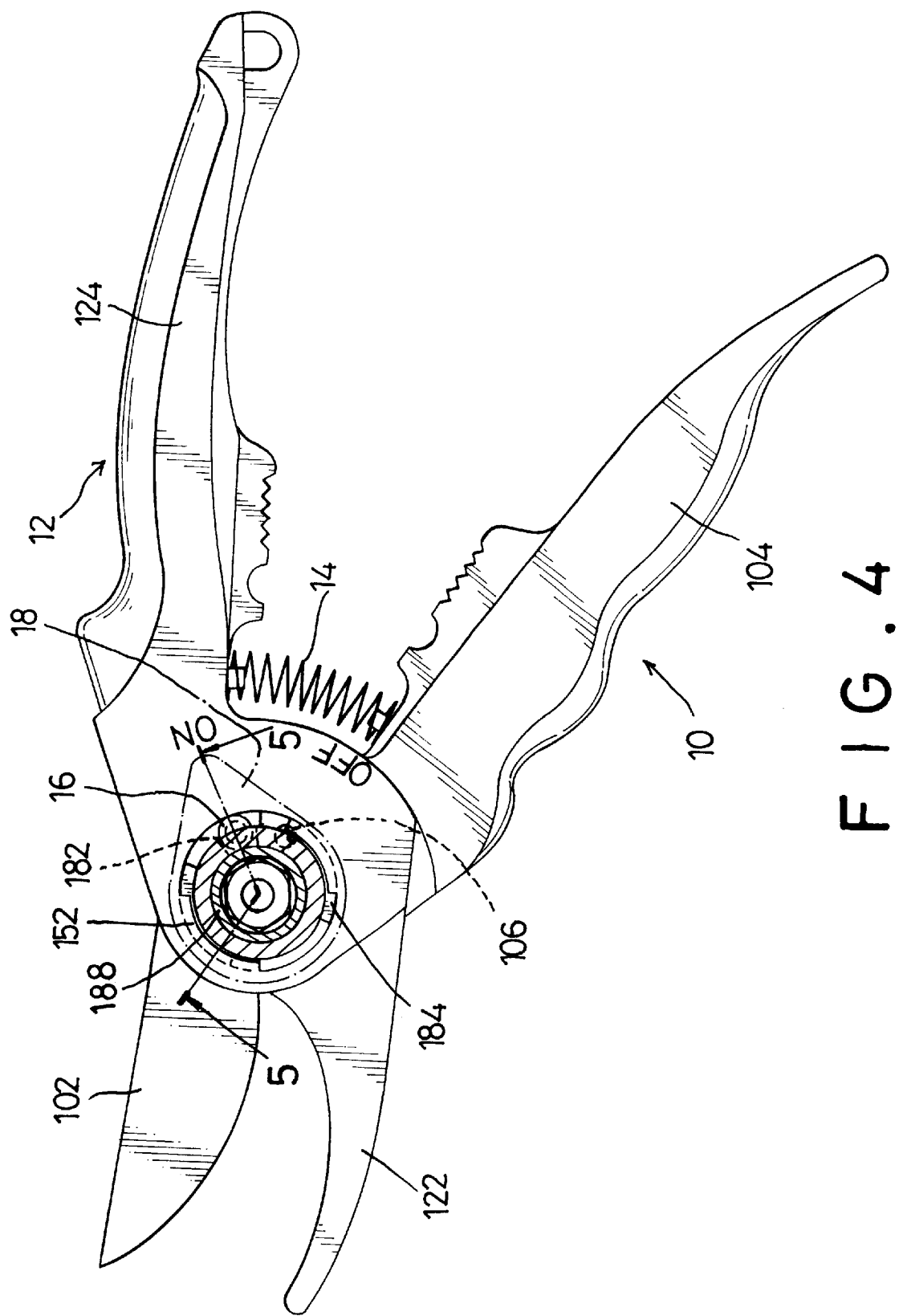
FIG. 4 is a front plan view in partial section of the pair of pruning shears in FIG. 1 showing the lock device being released.
Figure 5:
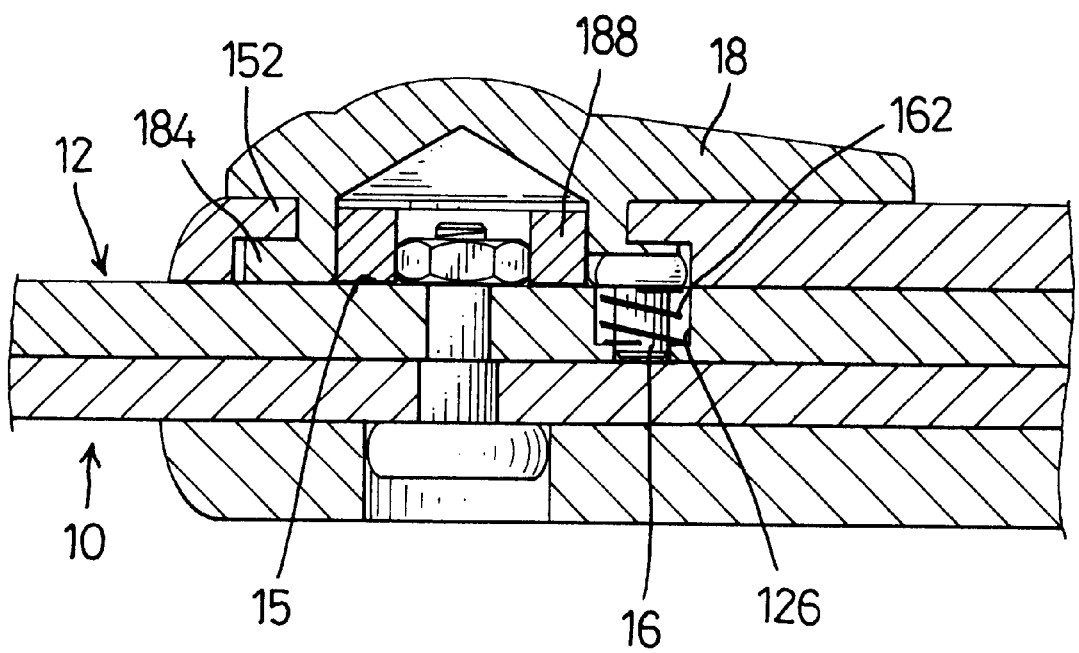
FIG. 5 is a partial side plan view in partial section of the lock device in FIG. 4.
Figure 6:
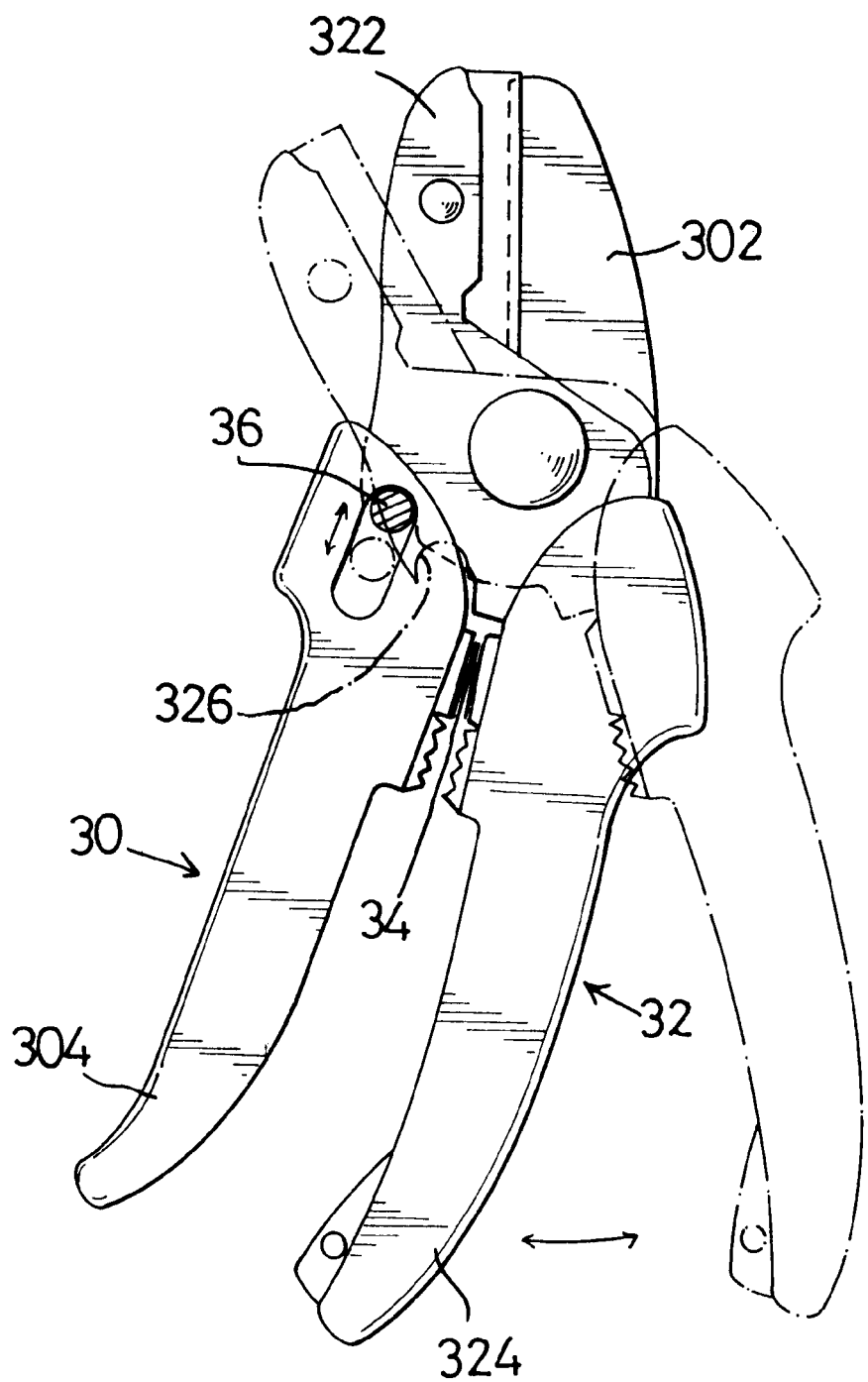
FIG. 6 is a front plan view in partial section of a pair of pruning shears with a conventional lock device in accordance with the prior art.

With reference to FIGS. 4 and 5, when the knob (18) is rotated to an angle that the cavity (182) faces the latch post (16), the pushing force provided by the knob (18) to the latch post (16) is eliminated, and the biasing member (162) pushes the latch post (16) out from the locking hole (106), whereby the engagement between the latch post (16) and locking hole (106) is released. The bodies (10,12) can rotate relative to each other, and the pair of pruning shears can be used to cut and prune trees or flowers.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pair of pruning shears with a lock device comprising:

a first body and a second body pivotally mounted together with a pivot, the first body and the second body each having a cutting end formed on one end thereof and a handle formed on the other end;

a spring connected between the first and the second handles of each of the bodies;

a stepped hole defined in the first body near the pivot;

a latch post moveably mounted in the stepped hole;

a biasing member received in the stepped hole to support the latch post;

a locking hole defined in the second body to align with the stepped hole when the bodies are pushed to close so as to engage with the latch post;

a knob rotatably mounted on the first body and having a bottom abutting the latch post; and a cavity defined in the bottom of the knob to face the latch post, wherein a chamber is defined in the first body to rotatably receive the knob;

the stepped hole is defined in a face defining the chamber;

at least one flange radially extends from the bottom of the knob;

an extension laterally extends into the chamber and apart from the face of the chamber to engage with each of the at least one flange of the knob; and each at least one flange has a length in 90° radian, and the extension has a length in 90° radian, thereby the knob can be rotatably held in the chamber by means of engagement between each flange and extension.

2. The pruning shears as claimed in claim 1, wherein a recess is defined in the bottom of the knob; and an annular collar is received in the recess to hold the pivot by which the two bodies are pivotally connected.

* * * * *